(12) United States Patent
Karapetkov et al.

(10) Patent No.: US 6,205,490 B1
(45) Date of Patent: Mar. 20, 2001

(54) SYSTEM (IWF) FOR THE BIDIRECTIONAL CONNECTION OF AN ELAN AND A CLS WIDE-AREA NETWORK

(75) Inventors: Stefan Karapetkov; Ingrid Fromm; Bernhard Petri, all of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/981,269

(22) PCT Filed: Jul. 1, 1996

(86) PCT No.: PCT/DE96/01168

§ 371 Date: Dec. 22, 1997

§ 102(e) Date: Dec. 22, 1997

(87) PCT Pub. No.: WO97/02683

PCT Pub. Date: Jan. 23, 1997

(30) Foreign Application Priority Data

Jul. 5, 1995 (DE) ............................................. 195 24 504
Sep. 28, 1995 (DE) ............................................. 195 36 200

(51) Int. Cl.[7] .................................................... G06F 13/00
(52) U.S. Cl. ............................................................ 709/249
(58) Field of Search ................................... 370/254, 397, 370/396, 410, 465; 709/200, 213, 230, 238, 246, 249

(56) References Cited

U.S. PATENT DOCUMENTS 5,444,702 * 8/1995 Burnett et al. ......................... 370/254

FOREIGN PATENT DOCUMENTS

WO
9606492A1 * 2/1996 (WO).

OTHER PUBLICATIONS

Crocetti et al. "Multicast in SMDS Over an ATM Network" IEEE pp. 1062–1066, 1992.*

International Telecommunication Union, "ITU–T Recommendation I.364" pp. 1–10, 1993.*

Truong et al. "LAN Emulation on an ATM Network" IEEE Communications Magazine pp. 70–85, 1995.*

* cited by examiner

Primary Examiner—Robert B. Harrell
(74) Attorney, Agent, or Firm—Schiff Hardin & Waite

(57) ABSTRACT

System for the bidirectional connection of an ELAN and a CLS wide-area network (CLSnet) having an address memory for allocated MAC addresses of the ELAN (ELAN 1, ...) and E.164 addresses of the CLS network (CLSnet), having a memory for an E.164 address allocated to the transition to the CLS network (CLSnet), and having a controller in order, dependent on specific conditions, to handover frames coming from the ELAN to the interface to the CLS network in common with the E.164 address belonging to the destination MAC address or, respectively, to discard them, whereby frames having a local broadcast MAC address as destination address are always to be discarded, and in order to hand frames coming from the wide-area network over to the interface to the ELAN.

28 Claims, 2 Drawing Sheets

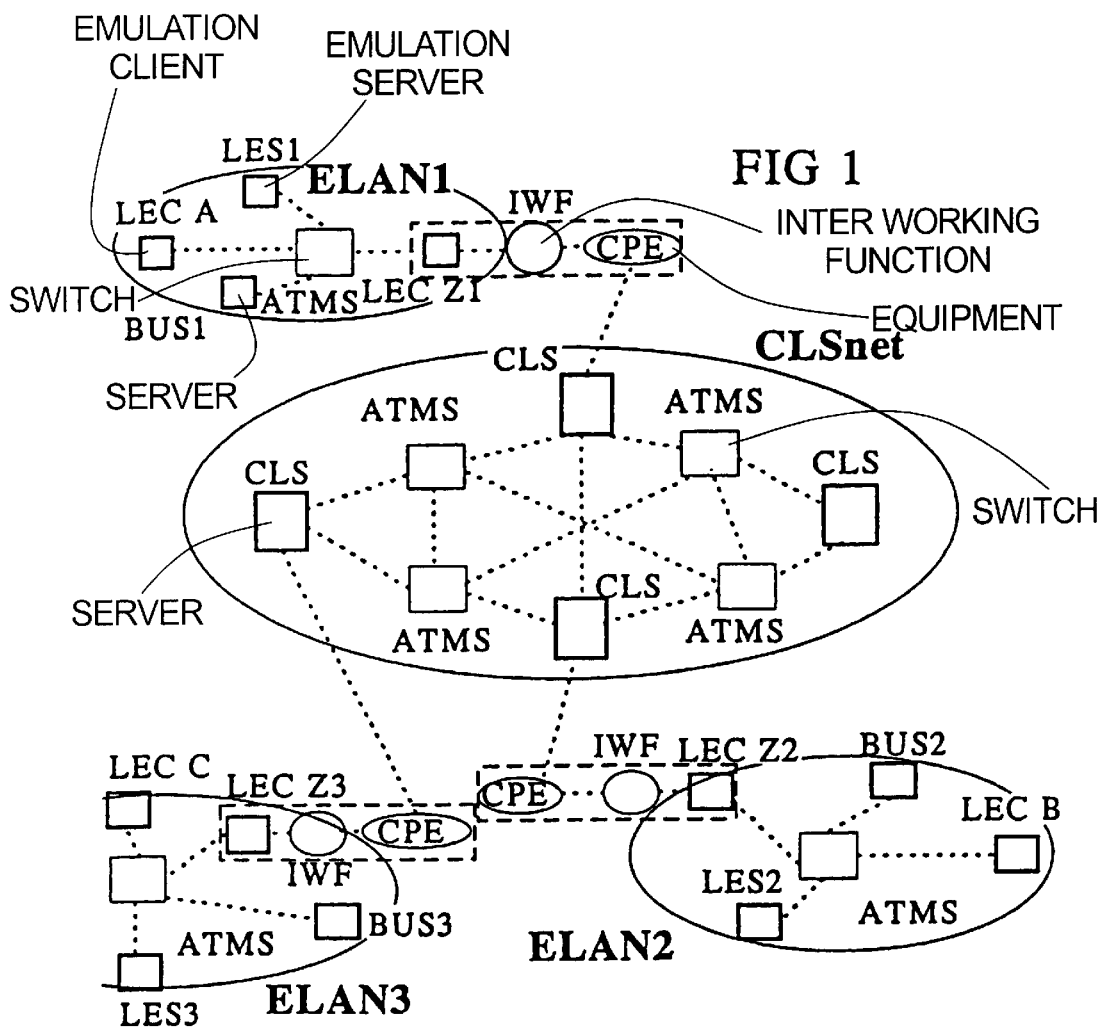

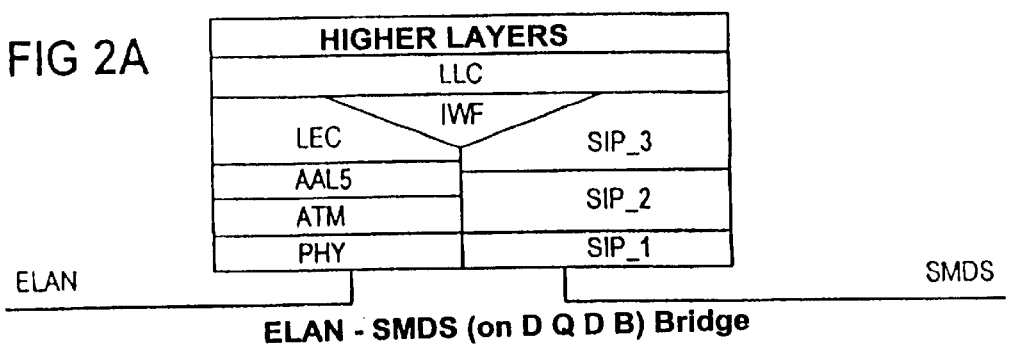

FIG 2A

ELAN - SMDS (on D Q D B) Bridge

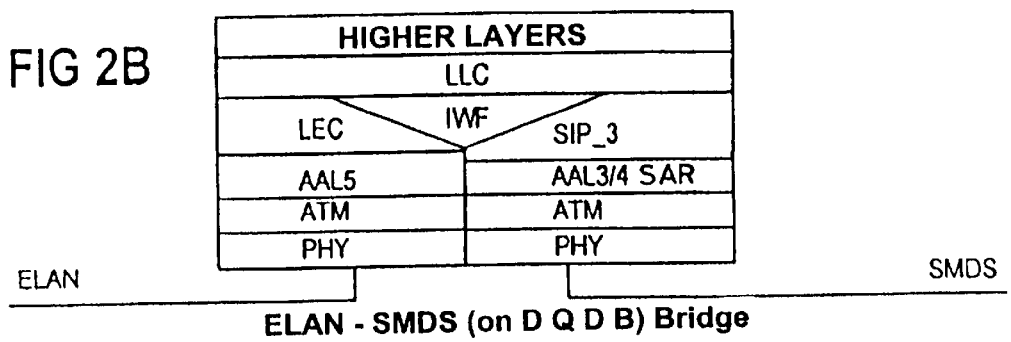

FIG 2B

ELAN - SMDS (on D Q D B) Bridge

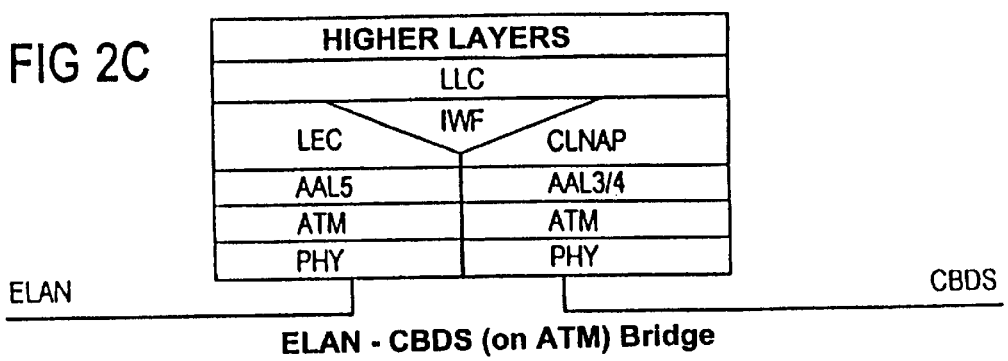

FIG 2C

ELAN - CBDS (on ATM) Bridge

| AAL | ATM Adaptation Layer |
| CBDS | Connectionless Broadband Data Service |
| DQDB | Distributed Queue Dual Bus |
| IWF | Interworking Function |
| LLC | Logical Link Control |
| SAR | Segmentation and Assembling Sub-Layers |
| SIP_2 | SMDS Interface Protocol Layer 2 |
| SMDS | Switched Multi-Megabit Data Service |

| ATM | Asynchronous Transfer Mode |
| CLNAP | Connectionless Network Access Protocol |
| ELAN | Emulated Local Area Network |
| LEC | LAN Emulation Client |
| PHY | Physical Layer |
| SIP_1 | SMDS Interface Protocol Layer 1 |
| SIP_3 | SMDS Interface Protocol Layer 3 |

SYSTEM (IWF) FOR THE BIDIRECTIONAL CONNECTION OF AN ELAN AND A CLS WIDE-AREA NETWORK

BACKGROUND OF THE INVENTION

The invention is directed to a means (IWF) for the bidirectional connection of an ELAN and a wide-area network offering a connectionless service.

ELAN stands for emulated LAN as described, in particular, in the specification 94-0035R9, "LAN Emulation Over ATM: Version 1.0" of the LAN Emulation SWG Drafting Group of the ATM Forum of Jan. 6, 1995, Bill Ellington, editor. This is thereby an approach of the ATM Forum to the migration of current LANs to ATM networks. ATM thereby means "Asynchronous Transfer Mode", i.e. asynchronous data or, respectively, information transmission methods. LAN is an abbreviation of "Local Area Network". LANs are datagram-oriented local networks that are described in, among other references, the article by David D. Clark, Kenneth D. Progran and David P. Reed, "An Introduction to Local Area Networks" in Proceedings of the IEEE, Vol. 66, No. 11, November 1978, pages 1497 through 1517. LANs are also described in ISO/IEC TR 8802-1, "Overview of LAN-Standards". LANs offer a connectionless service, what is referred to as the MAC service. MAC thereby stands for "Media Access Control". By contrast to this connectionless service, ATM technology is connection-oriented. When the protocols of the higher layers developed for LANs are to be used in emulated LANs on the basis of an ATM network, the properties of the connectionless MAC service must be produced in this ATM network. The LAN emulation according to the aforementioned specification realizes the MAC service in the local ATM network and thus defines a single emulated LAN, called ELAN below. The standard LAN protocols such as LLC, TCP/IP, SPX/IPX or TP/CLNP can be used in this ELAN.

The LAN emulation supports the two most frequently employed LAN standards, namely Ethernet according to IEEE 802.3 and Token Ring according to IEEE 802.5, whereby three frame lengths are supported given token ring. The routing of an information packet within an Ethernet ensues on the basis of a destination MAC address handed over from a higher layer. For the description of the information path, token ring LANs employ what are referred to as route descriptors in the frame header. The frame can be conveyed to the destination within token ring LANs on the basis of such a descriptor.

What is meant below by MAC address is an address within an LAN that corresponds to the route descriptor in a token ring and to the MAC address in an Ethernet.

For emulation of an LAN in an ATM network, the LAN emulation must, among other things, resolve destination MAC address into destination ATM addresses, realize multicast and broadcast, i.e. a distribution of information to a plurality of or to all subscribers, as well as assure the transmission of LAN emulation frames in the proper sequence. The LAN emulation has a client-server configuration. The client side is called LAN emulation client LEC and the server side is called LAN emulation service. The LAN emulation service is composed of LAN emulation server LES, broadcast-and-unknown server BUS and LAN emulation configuration server LECS. The LAN emulation client receives the destination MAC address from a higher-ranking layer, for example the LLC layer, and must find the corresponding ATM address, in order to subsequently initiate the setup of a direct ATM connection to the destination by signaling. The signaling can thereby ensue, for example, according to the ITU-T Recommendation Q.2831/Q.2971. An LEC can be a software driver that must be installed at all stations that are directly connected to the ATM network, i.e. are connected by an ATM hardware circuit to an ATM switch. However, an LEC can also be realized within this ATM hardware circuit.

An LEC maintains a table with all MAC addresses that are reported in the emulated LAN, for example in the framework of a configuration, and with the corresponding ATM addresses. The communication between the LECen and the LES ensues according to an LAN emulation address resolution protocol that, conforming to the English designation LAN Emulation Address Resolution Protocol, is referred to as LE_ARP. When an LEC does not know the destination ATM address of a destination MAC address, then it sends an inquiry with the destination MAC address to the LES. Such an inquiry for address resolution is referenced LE_ARP request. When the LES can resolve the destination ATM address, it replies with LE_ARP response. When it cannot, it sends the request to further LECen.

When an LEC receives an address resolution response LE_ARP response, then it sets up an ATM-UBR connection to the ATM address contained therein and sends a unicast frame. UBR thereby denotes "Unspecified Bit Rate", i.e. indicates that the bit rate is not specified. A unicast frame is an information or, respectively, data packet with a single addressee. In the transmission of frames within an ELAN, a distinction is made between unicast frame to one receiver and multicast or broadcast frame to several or all receivers. An ATM-UBR connection is maintained for 20 minutes from the last transmitted frame so that further frames can be sent to the same receiver in a simple way. To this end, the variable C12 is referenced in point 5.1.1 of the LAN emulation specification. The destination ATM addresses of destination MAC addresses are stored for a certain length of time in the LEC with the assistance of a cash mechanism. When there is no connection to a destination LEC but the destination ATM address is known in the sender LEC, a sender LEC can set up a connection without address resolution request and send a unicast frame.

Multicast frames to a group of subscribers or, respectively, LECs and broadcast frames to all subscribers or, respectively, LECs are sent to the aforementioned BUS. The BUS maintains connections to all LECs in its emulated LAN and distributes the arrived frames to the addressees.

Every LEC can be signed on in the configuration as what is referred to as proxy-LEC. A proxy-LEC receives all address resolution requests LE_ARP request that an LES cannot resolve. A proxy-LEC also receives all multicast and all broadcast frames.

The advantage of ATM technology is to be seen, among other things, therein that direct connections with flexible bandwidth can be set up between the communication parties. Such direct connections guarantee minimum time delays and a high information transmission rate. This advantage of ATM technology is utilized in the LAN emulation for unicast frames.

The connectionless service or CLS service can be realized with various technologies (for example, DQDB, ATM, FR). The service is described in the ITU-T Recommendation F.812.

Known realizations are the switched multi-megabit data service (SMDS) described in specifications of Bellcore, SMDS Interest Group (SIG) and European SMDS Interest Group (ESIG), as well as the connectionless broadband data service (CBDS) defined in ETSI Standard 300 217 and ITU-T Recommendation I.364. CLS has become widespread worldwide due to these realizations. Systems that offer this service are built by many manufacturers in the field of telecommunication.

The service is envisioned for worldwide data communication. At every access to the CLS network, one or more CLNAP addresses according to E.164 (E.164 address) are assigned (CLNAP=connection network access protocol).

A destination CLNAP address (E.164 address) is attached (encapsulation) to an incoming unicast frame with static or dynamic allocation tables on the basis of its destination MAC address and the encapsulated frame (also called CLS packet) is conducted to this CLNAP address.

For better understanding, the addresses in the ELAN are called unicast or, respectively, multicast/broadcast MAC addresses; but individual and group addresses shall be referred to in the CLS network.

Each CLS packet is transmitted independently of the others in the CLS network. The networks sees to the proper sequence of the CLS packets.

Under certain conditions (see prETS 300 478, 300 479), the CLNAP PDUs are encapsulated in CLNIP PDUs (CLNIP=connectionless network interface protocol).

The handling of multicast traffic in the CLS network is realized in the following way. What are referred to as group address agents (GAAs) contain tables with the individual CLNAP addresses that belong to a CLNAP group address. Each CLS packet that has a group address as destination address is conducted to the corresponding group address agent. When encapsulation was carried out, the same group address resides in the fields "CLNAP destination address" and "CLNIP destination address".

The GAA resolves the group address of the incoming CLS packet into individual CLNIP addresses, generates copies of the original packet and attaches to corresponding individual address to each copy as CLNIP address.

The "CLNAP destination address" field remains unmodified, so that the receiver can learn about the original group address. The LAN emulation describes an individual emulated LAN. No solutions are currently known for the coupling of ELANs. For performance reasons, the mechanisms described in the LAN emulation for address resolution and for the realization of multicast/broadcast in the WAN region cannot simply be transferred.

Various concepts for connecting local ATM networks such as, for example, ELANs via a wide-area ATM network are known in the article, "Interconnect Emulated LANs with White Area ATM networks" by Peter T. P. Chang and Bill Ellington, ATM Forum Technical Committee of Nov. 29 through Dec. 2, 1994.

In a first concept, a plurality of ELANs are thereby connected to a wide-area ATM network, whereby the address resolution and the data transmission are undertaken via a single LES and a single BUS. This concept leads to an enormous traffic volume for the realization of the broadcast function. The address resolution delay times in such a network are extremely high.

A further concept provides that ELANs be respectively connected to a wide-area ATM network via remote bridges. Either all remote bridges are thereby connected to one another via permanent virtual circuits PVC or the remote bridges are dynamically connected to one another with the assistance of an ATM signaling upon employment of an address resolution server. The transmission possibilities are thereby limited by the transmission possibilities of the remote bridges and the bandwidth of the permanent virtual circuits between two remote bridges. The remote bridges are flooded with broadcast and unknown servers of remote ELANs insofar as the remote bridge thereof does not respectively know the address of the remote bridges allocated to the destination MAC addresses.

A further concept provides that, instead of remote bridges, brouters be provided, a mixture of bridge and router. In this case, these brouters fulfill the function of an LAN emulation bridge at the ELAN side and fulfill the functions of a router at the side of the ATM wide-area network. As a result thereof, the broadcast problems are reduced; however, a limitation of the transmission possibilities via the ATM wide-area network due to the transmission possibilities of the brouters and of the permanent virtual circuits continues to exist.

A further concept provides that the LES of the individual ELANs as well as the BUS of the individual ELANs be connected to one another by direct connections. This, however, leads to a great plurality of direct connections and to a high traffic volume between the LES and the BUS of the individual ELANs. The traffic volume thereby increases linearly with the plurality of connected ELANs.

A further concept provides that the LES of the individual ELANs as well as the BUS of the individual ELANs be connected to a higher-ranking LES or, respectively, to a higher-ranking BUS via direct connections. This, however, likewise leads to a great plurality of direct connections and to a high traffic volume. The multilayer nature of BUS and higher-ranking BUS or, respectively, LES and higher-ranking LES also leads to time delays.

All described concepts provide for the coupling of an ELAN to an ATM network.

SUMMARY OF THE INVENTION

An object of the invention is to offer a means for the bidirectional connection of an ELAN and a wide-area network offering a connectionless service.

The object is respectively inventively achieved by four means differing slightly in terms of their functionality.

An inventive system for the bidirectional connection of an ELAN and a wide-area network offering a connectionless service has an address memory for MAC addresses of the ELAN and E.164 addresses of the wide-area network allocated to one another, a memory for an E.164 address allocated to the transition from the wide-area network to this means, and a controller in order to hand over frames coming from the interface between this means and the ELAN dependent on specific conditions at the interface between this means and the wide-area network, whereby the E.164 address belonging to the destination MAC address, respectively in common with the frame, is to be handed over to the wide-area network or, respectively, discarded at the interface (SIP_3, CLNAP), whereby data frames and address resolution request frames whose destination MAC address is a local broadcast MAC address are always to be discarded, and in order to hand over frames coming from the wide-are network at the interface to the ELAN.

Over and above this, the controller of a first inventive means is configured in order to discard address resolution request frames LE_ARP_Request and unicast as well as multicast data frames for whose destination MAC address no E.164 address is stored in the address memory, to forward address resolution request frames LE_ARP_Request and unicast as well as multicast data frames for whose destination MAC address an allocated E.164 address is stored in the address memory to the wide-area network.

The controller of a second inventive means is configured in order to discard unicast as well as multicast data frames for whose destination MAC address no allocated E.164 address is stored in the address memory, to forward unicast as well as multicast data frames for whose destination MAC address an allocated E.164 address is stored in the address memory to the wide-area network, to forward address resolution request frames (LE_ARP_Request) to the wide-area network for whose destination MAC address an allocated E.164 address is stored in the address memory, and to forward address resolution request frames (LE_ARP_Request) for whose destination MAC address no allocated E.164 address is stored in the address memory to the wide-area network with an E.164 address (global E.164 group address) allocated to all ELANs.

The controller of a third inventive means is configured in order to discard all unicast data frames, to discard multicast data frames and address resolution requests frames (LE_ARP_Request) for whose destination MAC address no allocated E.164 address is stored in the address memory and to forward multicast data frames and address resolution request frames to the wide-area network for whose destination MAC address an allocated E.164 address is stored in the address memory.

The controller of a fourth inventive means is configured in order to discard all unicast data frames, to discard multicast data frames for whose destination MAC address no allocated E.164 address is stored in the address memory, to forward multicast data frames and address resolution request frames (LE_ARP_Request) to the wide-area network for whose destination MAC address an allocated E.164 address is stored in the address memory and to forward address resolution request frames (LE_ARP_Request) for whose destination MAC address no allocated E.164 address to the wide-area network with an E.164 address (global E.164 group address) allocated to all ELANs.

Preferably, an ELAN is connected to a wide-area network offering a connectionless service such as, for example, SMDS (switched multi-megabit data service) or CBDS (connectionless broadband data service) in that an LEC of the ELAN is connected via an inventive means to a customer terminal means (CPE=customer premises entity) of the CLS wide-area network.

The inventive means is a matter of what is referred to as an "Interworking Function" (IWF), which is also referred to as transition function or conversion function, and that is arranged in the layer 2 according to the OSI reference model, at least with respect to the invention-specific functionality. An inventive means, consequently, can also be referred to as CLS bridge, i.e. as bridge function between emulated LAN and CLS network.

As explained above, a simple embodiment (aforementioned, first inventive means) of such a bridge can provide that address resolution request frames and unicast as well as multicast data frames are discarded when no allocated E.164 address is stored for their destination MAC address in the address memory, that address resolution request frames and unicast as well as multicast data frames are forwarded to the CLS wide-area network when an allocated E.164 address for their destination MAC address is stored in the address memory, and that data frames and address resolution request frames whose destination MAC address is a local broadcast MAC address are discarded. Respectively in common with the frame, the conversion function hands over the E.164 address belonging to the destination MAC address to the interface to the CLS wide-are network. The conversion function also hands over the E.164 address allocated to the source MAC address, at least for address resolution requests frames. As a result thereof, a later communication of information from the current receiver to the sender is simplified insofar as the address memory of the conversion function has a cache mechanism. Frames coming from the CLS wide-area network are handed over to the interface (layer LEC) to the ELAN.

Such an IWF is suited for the implementation of a method for determining a destination ATM address as response to an address resolution request output by a source LAN emulation client of a first ELAN when the destination MAC address is allocated to at least one LAN emulation client of a second ELAN. When, namely, the LES of the first ELAN hands over the address resolution request to an LEC with access to the CLS network via such an IWF, this address resolution request can be transmitted over the CLS network to the ELAN of the LAN emulation client allocated to the destination MAC address in order to be resolved thereat.

The described, simple conversion function provides that only address resolution requests for MAC addresses that are deposited in the address memory in common with the allocated E.164 address can be resolved. As a result thereof, only address resolution requests that are sure to be resolved proceed into the CLS wide-area network.

When address resolution requests for MAC addresses whose allocated E.164 addresses are not deposited in the address memory should also be capable of being resolved, then said conversion function according to the aforementioned second and fourth inventive means can be configured in order to forward address resolution request frames for whose destination MAC address no E.164 address is stored in the address memory to the CLS wide-area network with an E.164 group address allocated to all ELANs. Controlled, for example, by the group address agent GAA of the CLS wide-area network, such an address resolution request is then sent to all ELANs. Since the address resolution request frames are small, the CLS wide-area network is only slightly burdened by this measure.

Particularly for preventing the sending of unicast data frames in the CLS wide-area network whose ATM address was not known to the source LEC upon dispatch and that therefore proceed to the access LEC as unknown data frames via the broadcast and unknown server, it can be provided in a modification of the disclosed conversion function according to the aforementioned third and fourth inventive means that all unicast data frames be discarded. Since the address resolution request frame allocated to such a unicast data frame without ATM address is transmitted via the CLS wide-area network, the source LEC receives the ATM address required for an ATM connection setup and can initiate the connection setup. When a protection mechanism of a higher layer determines that a faulty transmission of at least the unknown data frame is present, a repeated transmission via an ATM connection can ensue.

A described conversion function can preferably be configured in order to forward data frames and address resolution request frames whose destination MAC address is a global broadcast MAC address to the wide-area network. The E.164 address allocated thereto corresponds to the aforementioned E.164 address that addresses all connected ELANs. This measure makes it possible to designationally transmit broadcast frames via the wide-area network even though local broadcast frames are discarded.

It is preferably provided in the described conversion functions to respectively store the MAC address allocated to the frame the sender of frames coming from the wide-area network as well as the E.164 address allocated thereto in the address memory. This facilitates the designational transmission of data—for example, an address resolution response—from the receiver of an information—for example, an address resolution request—to the sender of these information via the wide-area network offering a connectionless service.

A first realized example of the involvement of an above-described conversion function between an ELAN and a wide-area network offering a connectionless service for that case wherein the connectionless service is a switched multi-megabit data service SMDS and the wide-area network for the realization of this service is a distributed queue dual bus DQDB can provide that the protocol layers SMDS interface protocol layer 1 SIP_1, SMDS interface protocol layer 2 SIP_2 and SMDS interface protocol layer 3 SIP_3 are provided at the wide-area network side, and that the conversion function communicates at the wide-area network side with the SMDS interface protocol layer 3 SIP_3.

The protocol layers physical layer PHY, asynchronous transfer mode layer ATM, asynchronous transfer mode adaption layer AAL5 and LAN emulation client layer LEC can, for example, be thereby provided at the ELAN side, whereby the conversion function communicates at the ELAN side with the LAN emulation client layer (LEC).

In another example, the connectionless service can be a switched multi-megabit data service (SMDS) and the wide-area network for the realization of this service can be an ATM network, whereby the protocol layers physical layer PHY, asynchronous transfer mode layer ATM, segmentation and assembling sub-layer of the asynchronous transfer mode adaption layer 3/4 AAL3/4SAR and SMDS interface protocol layer 3 SIP_3 are provided at the wide-area network side, and whereby the conversion function communicates at the wide-area network side with the SMDS interface protocol layer 3 (SIP_3).

In a further example, the connectionless service can be a connectionless broadband data service CBDS and the wide-area network for the realization of this service can be an ATM network, whereby the protocol layers physical layer PHY, asynchronous transfer mode layer ATM, asynchronous transfer mode adaption layer 3/4 AAL3/4 and connectionless network access protocol layer CLNAP are provided at the wide-area network side, and whereby the conversion function communicates at the wide-area network side with the connectionless network access protocol layer CLNAP.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a network constellation with a plurality of ELANs that can be coupled via an ATM network and a CLS network.

FIGS. 2A, 2B, 2C respectively show a protocol stack when coupling ELANs by SMDS network or, respectively, CBDS network.

DESCRIPTION OF THE PREFERRED EMBODIMENTS

FIG. 1 shows three ELANs ELAN1, ELAN2 and ELAN3 respectively having an LAN emulation server LES, an ATM switching means ATMS, an LAN emulation client LEC A, LEC B, LEC and a specific LAN emulation client LEC Z1, LEC Z2, LEC Z3 that is referred to below as access LEC and that enables then respective ELAN ELAN1, ELAN2 or, respectively, ELAN3 to have access via a customer premises equipment CPE to a network CLSnet (also shown) that offers a connectionless service. Each customer premises equipment CPE thereby has an interworking function IWF allocated to it as inventive means.

In the exemplary embodiment of FIG. 1, the network CLSnet offering a connectionless service is realized with the assistance of a higher-ranking (spatially higher-ranking, i.e. regional or global) ATM network with ATM switching equipment ATMS. The type of realization of the network CLSnet offering a connectionless service, however, has no influence on the invention.

The broadcast and unknown server BUS1, BUS2, BUS3 of the ELAN1, ELAN2 and ELAN3 are also respectively shown in FIG. 1. As shown by an overlapping frame, access LEC LEC Z1, LEC Z2 or, respectively, LEC Z3, interworking function IWF and customer premises equipment CPE in the illustrated example respectively form a bridge whose bridge function is the interworking function IWF.

The network CLSnet offering a connectionless service contains a server (connectionless server) CLS offering a connectionless service and a group address agent GAA.

As inventive means, the IWF realizes the connection between the "access LEC" on the one hand and the CLS network on the other hand. The IWF for the coupling of ELANs by the CLS network handles MAC and E.164 addresses and is to be allocated to layer 2 according to the OSI reference model. I.e., the IWF is an ELAN-CLS bridge.

When the IWF is also to fulfill routing functions, it can also handle layer 3 addresses (for example, IP, IPX, etc.). This, however, is not required for the realization of the methods of the invention.

The protocol stack for coupling ELANs by the SMDS network or, respectively, by the CBDS network is respectively shown in the example in FIGS. 2A, 2B and 2C. The SMDS service is realized with the DCDB technology in the example according to FIG. 2A and is realized with the ATM technology in the example according to FIG. 2B. The CBDS service is realized with the ATM technology in the example according to FIG. 2C.

The IWF has the following jobs:
I. Readying the following parameters:
I.1. Receiver E.164 address To this end, the IWF must maintain a table with MAC addresses and the corresponding E.164 addresses. For example, the entries in the table are set by network management but can also be filled out on the basis of the sender MAC address and sender E.164 address of the arrived CLS packets and be deleted after a certain time.
I.2. Sender E.164 address This is the E.164 address of the IWF.
II. Handling the frames according to the destination MAC address and the frame type in the above-recited way.

A first realized example for the incorporation of an above-described interworking function between an ELAN and a wide-area network offering a connectionless service for that case wherein the connectionless service is a "switched multi-megabit data service" SMDS and the wide-area network for the realization of this service is a "distributed queue dual bus" DQDB can provide that—at the wide-area network side—the protocol layers SMDS interface protocol layer 1, SIP_1, SMDS interface protocol layer 2, SIP_2, and SMDS interface protocol layer 3, SIP_3 are provided and that the interworking function communicates at the wide-area network side with the SMDS interface protocol layer 3, SIP_3.

At, for example, the ELAN side, the protocol layers physical layer, PHY, asynchronous transfer mode layer, ATM, asynchronous transfer mode adaption layer-5, AAL5, and LAN emulation client layer, LEC, are provided, whereby the interworking function communicates at the ELAN side with the LAN emulation client layer, LEC.

In another example, the connectionless service can be a "switched multi-megabit data service" (SMDS) and the wide-area network for the realization of this service can be an ATM network, whereby the protocol layers physical layer, PHY, asynchronous transfer mode layer, ATM, segmentation and assembling sub-layer of the asynchronous adaption layer-3/4, AAL3/4SAR, and SMDS interface protocol layer 3, SIP_3 are provided at the wide-area network side, and whereby the interworking function communicates at the wide-area network side with the SMDS interface protocol layer 3, SIP_3.

In a further example, the connectionless service can be a "connectionless broadband data service" CBDS, and the wide-area network for the realization of this service can be an ATM network, whereby—at the wide-area network side—the protocol layers physical layer, PHY, asynchronous transfer mode layer, ATM, asynchronous transfer mode adaption layer-3/4, AAL3/4, and connectionless network access protocol layer, CLNAP, are provided, and whereby the interworking function communicates at the wide-area network side with the connectionless network access protocol layer, CLNAP.

The meanings of the abbreviations employed are recited below in the form of the technical terms according to the applicable standards:

| | |
|---|---|
| AAL | ATM adaptation layer |
| ATM | asynchronous transfer mode |
| BUS | broadcast and unknown server |
| CBDS | connectionless broadband data service |
| CLNAP | connectionless network access protocol |
| CLNIP | connectionless network interface protocol |
| CLNP | connectionless network protocol |
| CLS | connectionless service/server |
| CPE | customer premises equipment |
| CRC | cyclic redundancy check |
| DQDB | distributed queue dual bus |
| DS1 | digital signal 1 |
| DS3 | digital signal 3 |
| E1 | European transmission level 1 |
| E3 | European transmission level 3 |
| ELAN | emulated local area network |
| ESIG | European SMDS Interest Group |
| ETSI | European Telecommunications Standards Institute |
| FR | frame relay |
| GAA | group address agent |
| IEEE | Institute of Electrical and Electronics Engineers |
| IP | Internet protocol |
| IPX | internetwork packet exchange |
| ITU-T | International Telecommunications Union-Telecommunications |
| IWF | interworking function |
| L3_PDU | Level 3 protocol data unit |
| LAN | local area network |
| LE_ARP | LAN emulation address resolution protocol |
| LEC | LAN emulation client |
| LECS | LAN emulation configuration server |
| LES | LAN emulation server |
| LLC | logical link control |
| MAC | media access control |
| OSI | open systems interconnection |
| PDU | protocol data unit |
| PHY | physical layer |
| SIG | SMDS Interest Group |
| SIP_3 | SMDS interface protocol layer 3 |
| SMDS | switched multi-megabit data service |
| SPX | sequenced packet exchange |
| TCP | transmission control protocol |
| TP | transport protocol |
| UBR | unspecified bit rate |
| WAN | wide area network |

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A bidirectional connection apparatus for use with an ELAN and a wide-area network offering a connectionless service, comprising:

an address memory for MAC addresses of the ELAN and E.164 addresses of the wide-area network that are allocated to one another;

a memory for an E.164 address allocated to a transition from the wide-area network to the apparatus; and a controller for discarding address resolution request frames and unicast as well as multicast data frames for whose destination MAC address an allocated E.164 address is stored in the address memory, forwarding address resolution request frames and unicast as well as multicast data frames to the wide-area network for whose destination MAC address an allocated E.164 address is stored in the address memory, and discarding data frames and address resolution request frames whose destination MAC address is a local broadcast MAC address, whereby the E.164 address belonging to the destination MAC address is respectively handed over to an interface to the wide-area network in common with the frame, and in order to hand frames coming from the wide-area network over to an interface to the ELAN.

2. The apparatus according to claim 1, wherein the controller is configured to forward date frames and address resolution request frames whose destination MAC address is a global broadcast MAC address to the wide-area network.

3. The apparatus according to claim 1, wherein the controller is configured to respectively store the MAC address allocated to a sender of frames coming from the wide-area network as well as the E.164 address allocated thereto in the address memory.

4. The apparatus according to claim 1, wherein the connectionless service is a switched multi-megabit data service; wherein the wide-area network for the realization of this service is a distributed queue dual bus; wherein at a wide-area network side has protocol layers of interface protocol layer 1, 2 and 3; and wherein the apparatus is an interworking function that communicates at the wide-area network side with the interface protocol layer 3.

5. The apparatus according to claim 1, wherein the connectionless service is a switched multi-megabit data service; wherein the wide-area network for realization of this service transmits in asynchronous transfer mode; wherein at a wide-area network side, the protocol layers have physical layer, asynchronous transfer mode layer, segmentation and assembling sub-layer of the asynchronous transfer mode adaption layer-3/4 and interface protocol layer 3; and the apparatus is an interworking function that communicates at the wide-area network side with the interface protocol layer 3.

6. The apparatus according to claim 1, wherein the connectionless service is a connectionless broadband data service; wherein the wide-area network for realization of this service transmits in the asynchronous transfer mode; wherein in a wide-area network side, the protocol layers have physical layer, asynchronous transfer mode layer, asynchronous transfer mode adaption layer-3/4 and connectionless network access protocol layer; and wherein the apparatus is an interworking function that communicates at the wide-area network side with the connectionless network access protocol layer.

7. The apparatus according to claim 1, wherein, at a ELAN side, the protocol layers have physical layer, asynchronous transfer mode layer, asynchronous transfer mode adaption layer-5 and LAN emulation client layer; and wherein the apparatus is an interworking function that communicates at the ELAN side with a LAN emulation client layer.

8. A bidirectional connection apparatus for use with an ELAN and a wide-area network offering a connectionless service, comprising:
   an address memory for MAC addresses of the ELAN and E.164 addresses of the wide-area network that are allocated to one another;
   a memory for an E.164 address allocated to a transition from the wide-area network to the apparatus; and
   a controller for
      discarding unicast as well as multicast data frames coming from the ELAN for whose destination MAC address an allocated E.164 address is stored in the address memory,
      forwarding unicast as well as multicast data frames coming from the ELAN to the wide-area network for whose destination MAC address an allocated E.164 address is stored in the address memory,
      forwarding address resolution request frames coming from the ELAN to the wide-area network for whose destination MAC address an allocated E.164 address is stored in the address memory,
      forwarding address resolution request frames coming from the ELAN for whose destination MAC address an allocated E.164 address is stored in the address memory to the wide-area network with an E.164 address allocated to all ELANs, and
      discarding data frames and address resolution request frames coming from the ELAN whose destination MAC address is a local broadcast MAC address, whereby the E.164 address belonging to the destination MAC address is respectively handed over to an interface to the wide-area network in common with the frame,
   and in order to hand frames coming from the wide-area network over to an interface to the ELAN.

9. The apparatus according to claim 8, wherein the controller is configured to forward date frames and address resolution request frames whose destination MAC address is a global broadcast MAC address to the wide-area network.

10. The apparatus according to claim 8, wherein the controller is configured to respectively store the MAC address allocated to a sender of frames coming from the wide-area network as well as the E.164 address allocated thereto in the address memory.

11. The apparatus according to claim 8, wherein the connectionless service is a switched multi-megabit data service; wherein the wide-area network for the realization of this service is a distributed queue dual bus, wherein at a wide-area network side has protocol layers of interface protocol layer 1, 2 and 3; and wherein the apparatus is an interworking function that communicates at the wide-area network side with the interface protocol layer 3.

12. The apparatus according to claim 8, wherein the connectionless service is a switched multi-megabit data service; wherein the wide-area network for realization of this service transmits in asynchronous transfer mode; wherein at a wide-area network side, the protocol layers have physical layer, asynchronous transfer mode layer, segmentation and assembling sub-layer of the asynchronous transfer mode adaption layer-3/4 and interface protocol layer 3; and the apparatus is an interworking function that communicates at the wide-area network side with the interface protocol layer 3.

13. The apparatus according to claim 8, wherein the connectionless service is a connectionless broadband data service; wherein the wide-area network for realization of this service transmits in the asynchronous transfer mode; wherein in a wide-area network side, the protocol layers have physical layer, asynchronous transfer mode layer, asynchronous transfer mode adaption layer-3/4 and connectionless network access protocol layer; and wherein the apparatus is an interworking function that communicates at the wide-area network side with the connectionless network access protocol layer.

14. The apparatus according to claim 8, wherein, at a ELAN side, the protocol layers have physical layer, asynchronous transfer mode layer, asynchronous transfer mode adaption layer-5 and LAN emulation client layer; and wherein the apparatus is an interworking function that communicates at the ELAN side with a LAN emulation client layer.

15. A bidirectional connection apparatus for use with an ELAN and a wide-area network offering a connectionless service, comprising:
   an address memory for MAC addresses of the ELAN and E.164 addresses of the wide-area network that are allocated to one another;
   a memory for an E.164 address allocated to the transition from the wide-area network to the apparatus; and
   a controller for
      discarding all unicast data frames,
      discarding multicast data frames and address resolution request frames for whose destination MAC address an allocated E.164 address is stored in the address memory,
      forwarding multicast data frames and address resolution request frames to the wide-area network for whose destination MAC address an allocated E.164 address is stored in the address memory, and
      discarding data frames and address resolution request frames whose destination MAC address is a local broadcast MAC address, whereby the E.164 address belonging to the destination MAC address is respectively handed over to an interface to the wide-area network in common with the frame, and in order to hand frames coming from the wide-area network over to an interface to the ELAN.

16. The apparatus according to claim 15, wherein the controller is configured to forward date frames and address resolution request frames whose destination MAC address is a global broadcast MAC address to the wide-area network.

17. The apparatus according to claim 15, wherein the controller is configured to respectively store the MAC address allocated to a sender of frames coming from the wide-area network as well as the E.164 address allocated thereto in the address memory.

18. The apparatus according to claim 15, wherein the connectionless service is a switched multi-megabit data service; wherein the wide-area network for the realization of this service is a distributed queue dual bus, wherein at a wide-area network side has protocol layers of interface protocol layer 1, 2 and 3; and wherein the apparatus is an interworking function that communicates at the wide-area network side with the interface protocol layer 3.

19. The apparatus according to claim 15, wherein the connectionless service is a switched multi-megabit data service; wherein the wide-area network for realization of this service transmits in asynchronous transfer mode; wherein at a wide-area network side, the protocol layers have physical layer, asynchronous transfer mode layer, segmentation and assembling sub-layer of the asynchronous transfer mode adaption layer-3/4 and interface protocol layer 3; and the apparatus is an interworking function that communicates at the wide-area network side with the interface protocol layer 3.

20. The apparatus according to claim 15, wherein the connectionless service is a connectionless broadband data service; wherein the wide-area network for realization of this service transmits in the asynchronous transfer mode; wherein in a wide-area network side, the protocol layers have physical layer, asynchronous transfer mode layer, asynchronous transfer mode adaption layer-3/4 and connectionless network access protocol layer; and wherein the apparatus is an interworking function that communicates at the wide-area network side with the connectionless network access protocol layer.

21. The apparatus according to claim 15, wherein, at a ELAN side, the protocol layers have physical layer, asynchronous transfer mode layer, asynchronous transfer mode adaption layer-5 and LAN emulation client layer; and wherein the apparatus is an interworking function that communicates at the ELAN side with a LAN emulation client layer.

22. A bidirectional connection apparatus for use with an ELAN and a wide-are a network offering a connectionless service, comprising:

an address memory for MAC addresses of the ELAN and E.164 addresses of the wide-area network that are allocated to one another;

a memory for an E.164 address allocated to the transition from the wide-area network to the apparatus; and a controller for
discarding all unicast data frames,
discarding multicast data for whose destination MAC address an allocated E.164 address is stored in the address memory, forwarding multicast data frames and address resolution request frames to the wide-area network for whose destination MAC address an allocated E.164 address is stored in the address memory, forwarding address resolution request frames for whose destination MAC address an allocated E.164 address is stored in the address memory to the wide-area network with an E.164 address allocated to all ELANs, and discarding data frames and address resolution request frames whose destination MAC address is a local broadcast MAC address, whereby the E.164 address belonging to the destination MAC address is respectively handed over to an interface to the wide-area network in common with the frame, and in order to hand frames coming from the wide-area network over to an interface to the ELAN.

23. The apparatus according to claim 22, wherein the controller is configured to forward date frames and address resolution request frames whose destination MAC address is a global broadcast MAC address to the wide-area network.

24. The apparatus according to claim 22, wherein the controller is configured to respectively store the MAC address allocated to a sender of frames coming from the wide-area network as well as the E.164 address allocated thereto in the address memory.

25. The apparatus according to claim 22, wherein the connectionless service is a switched multi-megabit data service; wherein the wide-area network for the realization of this service is a distributed queue dual bus, wherein at a wide-area network side has protocol layers of interface protocol layer 1, 2 and 3; and wherein the apparatus is an interworking function that communicates at the wide-area network side with the interface protocol layer 3.

26. The apparatus according to claim 22, wherein the connectionless service is a switched multi-megabit data service; wherein the wide-area network for realization of this service transmits in asynchronous transfer mode; wherein at a wide-area network side, the protocol layers have physical layer, asynchronous transfer mode layer, segmentation and assembling sub-layer of the asynchronous transfer mode adaption layer-3/4 and interface protocol layer 3; and the apparatus is an interworking function that communicates at the wide-area network side with the interface protocol layer 3.

27. The apparatus according to claim 22, wherein the connectionless service is a connectionless broadband data service; wherein the wide-area network for realization of this service transmits in the asynchronous transfer mode; wherein in a wide-area network side, the protocol layers have physical layer, asynchronous transfer mode layer, asynchronous transfer mode adaption layer-3/4 and connectionless network access protocol layer; and wherein the apparatus is an interworking function that communicates at the wide-area network side with the connectionless network access protocol layer.

28. The apparatus according to claim 22, wherein, at a ELAN side, the protocol layers have physical layer, asynchronous transfer mode layer, asynchronous transfer mode adaption layer-5 and LAN emulation client layer; and wherein the apparatus is an interworking function that communicates at the ELAN side with a LAN emulation client layer.

* * * * *